Figure 4:
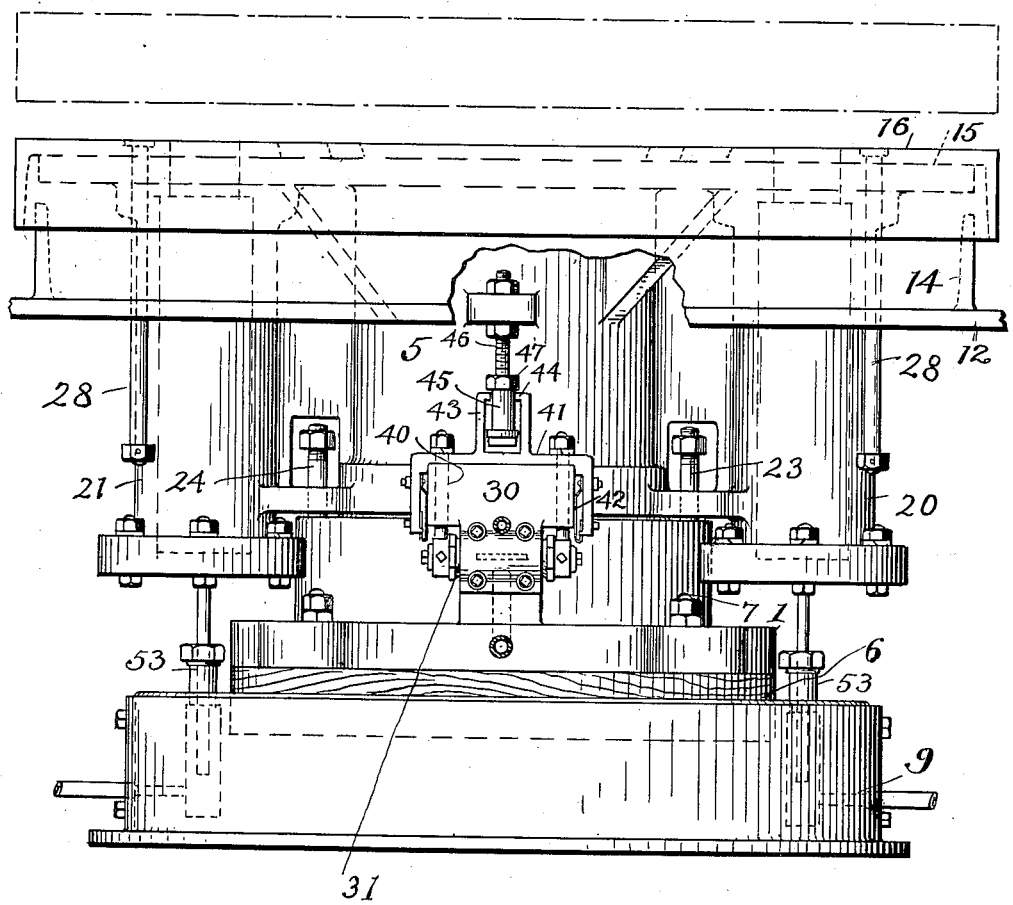

G. F. STONEY & G. L. CAMPBELL.
MOLDING MACHINE.
APPLICATION FILED SEPT. 20, 1912.
1,070,749.
Patented Aug. 19, 1913.
4 SHEETS—SHEET 1.
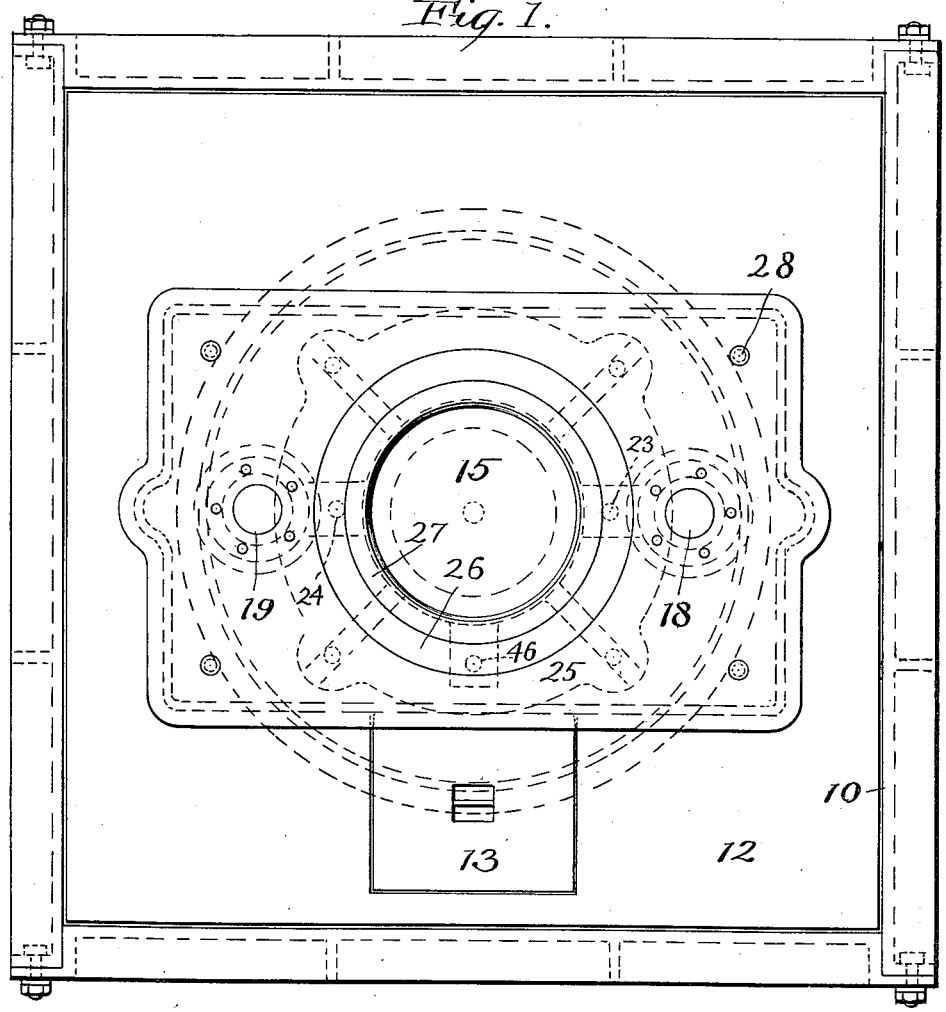
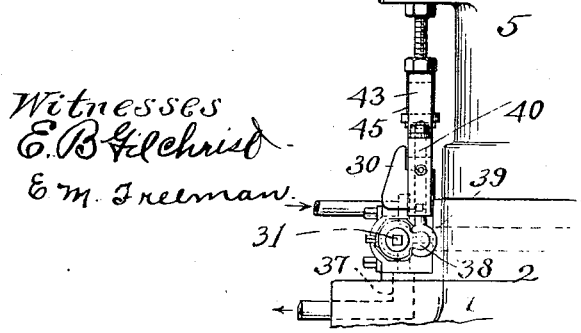

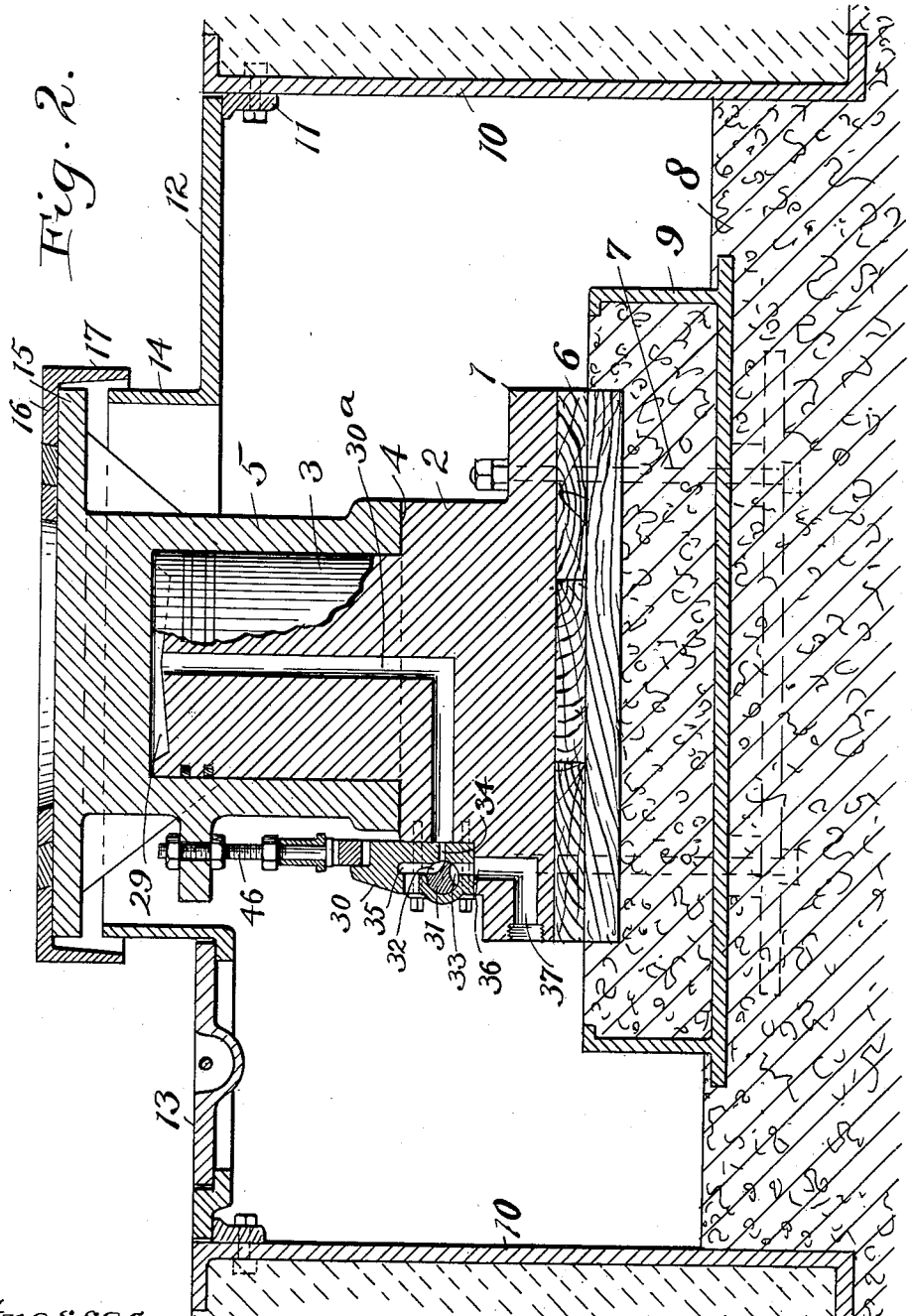

G. F. STONEY & G. L. CAMPBELL.
MOLDING MACHINE.
APPLICATION FILED SEPT. 20, 1912.
1,070,749.
Patented Aug. 19, 1913.
4 SHEETS—SHEET 3.
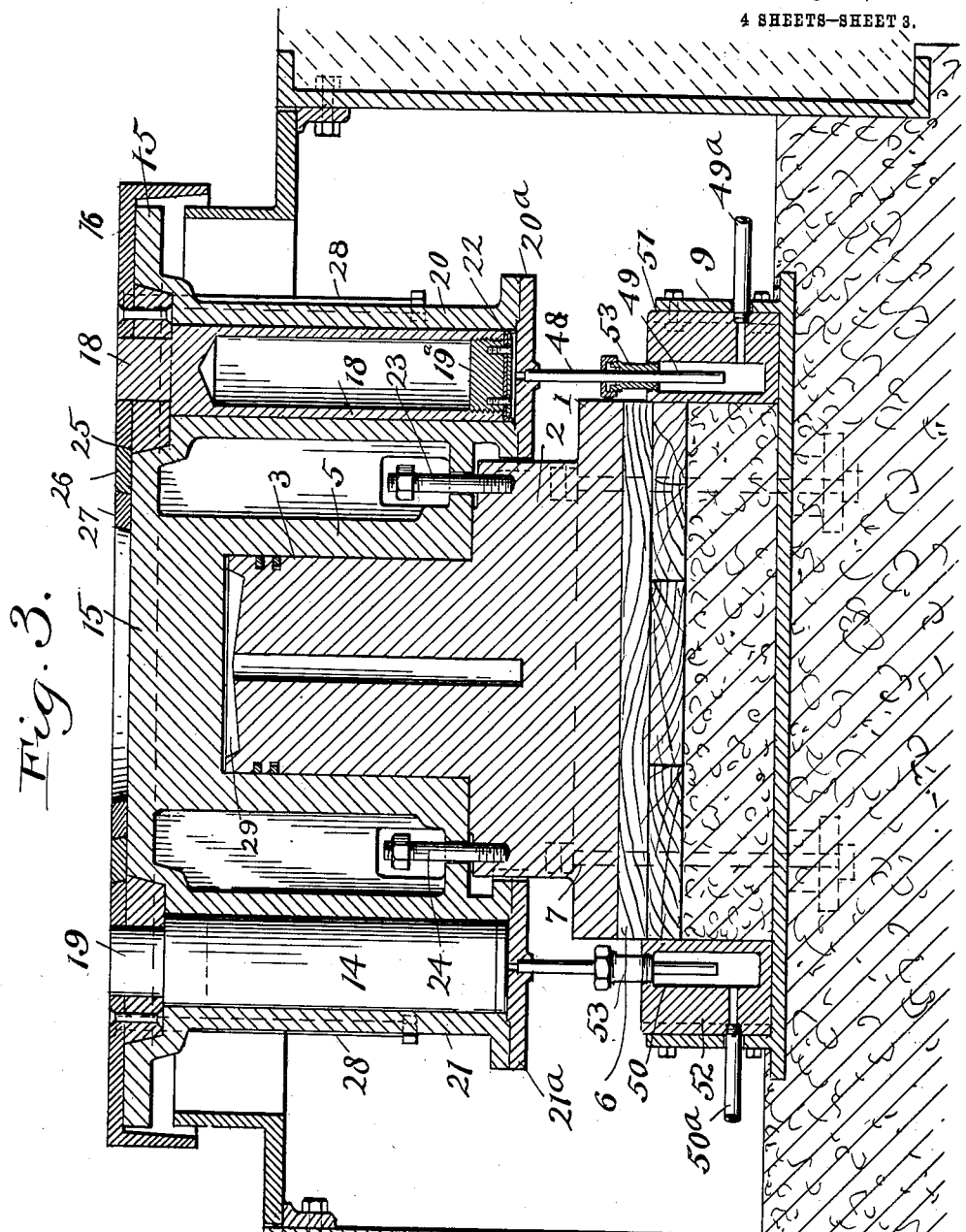

G. F. STONEY & G. L. CAMPBELL.
MOLDING MACHINE.
APPLICATION FILED SEPT. 20, 1912.

1,070,749.

Patented Aug. 19, 1913.

4 SHEETS—SHEET 4.

UNITED STATES PATENT OFFICE.

GEORGE F. STONEY AND GEORGE L. CAMPBELL, OF ELYRIA, OHIO.

MOLDING-MACHINE.

1,070,749.   Specification of Letters Patent.   Patented Aug. 19, 1913.

Application filed September 20, 1912. Serial No. 721,411.

*To all whom it may concern:*

Be it known that we, GEORGE F. STONEY and GEORGE L. CAMPBELL, citizens of the United States, and residents of Elyria, in the county of Lorain and State of Ohio, have invented a certain new and useful Improvement in Molding-Machines, of which the following is a full, clear, and exact description.

This invention relates to molding machines of the type in which the mold is vibrated, and the machine is provided with additional means for operating a stripping plate.

The object of the invention is to provide a machine in which improved features of construction are embodied, as will appear in the description.

Generally speaking, the invention comprises the elements and combinations thereof set forth in the accompanying claims.

Reference should be had to the accompanying drawings in which—

Figure 1 is a top plan view of the machine; Fig. 2 is a substantially central vertical section through the machine; Fig. 3 is a vertical section through the machine at right angles to the showing in Fig. 2; Fig. 4 is a front elevation of the machine; Fig. 5 is a side elevation of a portion of the machine showing the valve mechanism.

The molding machine comprises a jarring base 1 from which extends a head 2 which in turn is formed with an extending piston 3, the piston being of less diameter than the head, thereby providing a ledge 4. Coöperating with the piston 3 is a cylinder 5 which is of proper size to have a working fit over the piston 3. The lower end of the cylinder engages with the ledge 4 on the head 2 and as the cylinder is raised and lowered, for the purpose of jarring the mold, the lower portions of the cylinder are successively and in rapid sequence, brought into contact with the ledge 4. The base 1 is preferably located beneath the level of the floor on which the molding operation is carried on, and this is for the purpose of convenience in manipulating the machine and the flasks. In the instance shown, the base 1 rests upon suitable planking 6, through which and the base 1 extend long bolts 7, that are embedded in concrete illustrated at 8. The timbers 6 beneath the base 1 are embedded in concrete contained within a receptacle 9, which receptacle is provided with a flange base, and also is secured through the agency of the concrete 8. This provides a most secure and solid foundation for the machine.

The walls of the pit may or may not be lined as is found desirable. However, the walls will be provided with certain upright members indicated at 10 on all four sides thereof, these members having secured thereto longitudinally extending members 11 which form a ledge for the purpose of receiving and supporting a cover 12 which incloses the pit, and forms a portion of the floor upon which the molding operation may be conducted.

The cover 12 is provided with a removable portion 13 by which access may be had to the pit without removing the entire cover 12. This cover 12 is provided with a central opening which is surrounded with an upwardly extending flange 14, which serves to protect the mechanism within the pit from receiving undue amounts of dust and dirt which might accumulate and be pushed into the pit from the molding floor. The cylinder 5 has formed upon the top thereof a table 15 upon which may be secured a pattern or patterns from which it is desired to mold. Normally resting upon the table 15 is an equalizing stripping plate 16 which is provided with a downwardly extending flange 17, the flanges extending below the upper rim of the flange 14. These overlapping flanges 14 and 17 guard against any moldings and finding direct entrance into the pit, as might be the case when the table and stripping plate are in their lowermost positions when the flask is being packed and jarred.

The stripping plate 16 is near its opposite ends secured to pistons 18 and 19, which pistons reciprocate within cylinders 20 and 21. These cylinders are formed integral with the cylinder 5 and the table 15, the cylinders being joined to the parts above mentioned by suitable flanges and webs, producing a strong construction which does away with numerous bolts and other fastening means which are very apt to become loosened by the continued use of the machine, and which results in the stripping plate pistons getting out of alinement with each other and with the piston which causes the jarring of the mold, often resulting in a poor stripping of the mold, and not infrequently damaging the mold, and thereby making extra work to patch the mold so that it may be usable. The lower portions of the cylinders 20 and 21 are closed by heads 20ª and 21ª which are secured in position in any desired manner. The pistons 18 are preferably hollow, being provided with a head 19ª which is secured upon the hollow piston by a screw thread engagement, the head 19ª being provided with suitable packing washers 22. The rods 23 and 24 are secured in the head 2 and extend through openings in flanges connecting the cylinder 5 and the cylinders 20 and 21. These rods are provided with adjustable nuts, thereby adjustably limiting the upward motion of the cylinder 5 and the other parts secured thereto.

It will be understood that the purpose of the pistons 18 is to operate the equalizing stripping plate 16, so that the same may be moved relative to the table 15, which carries the pattern. The points of engagement between the equalizing stripping plate and the pistons is such that the pistons must move together, otherwise a binding action occurs, which retards the piston moving most rapidly, until the companion piston has reached the same level, after which both will move along together. The arrangement is such that the stripping plate 16 is moved but very little from its horizontal position, even when accomplishing its function of equalizing the travel of the pistons 18 and 19.

The equalizing stripping plate 16 is provided with a central opening, the walls of which are slanting or beveled as indicated at 25, in Fig. 3. This opening is for the purpose of permitting the insertion of smaller stripping plates which are selected of proper size for the particular molding to be made, and the opening 25 is of sufficient size to accommodate various size auxiliary stripping plates, such as represented at 26 and 27, so that the use of a large variety of stripping plates used at different times is permissible.

The relative movement between the table 15 and the equalizing stripping plate 16 is limited by rods 28, four of which are used as indicated in Fig. 1. These rods are secured to the stripping plate 16 and extend through openings in the table 15. The lower ends of the rods are provided with heads or nuts which will engage with the table 15 when the equalizing plate is raised a sufficient amount.

The upper portion of the piston 3 is recessed, as indicated at 29, and communicating with this recessed portion is a duct 30ª which extends through the piston 3 and through the head 2, emerging upon the side of the head. There is secured upon the head a housing 30 which contains a rotary valve 31. This valve is elongated and is provided with two grooves 32 and 33 which are adapted to be brought at alternate times into registration with a slot 34 which registers with the duct 30ª in the head 2.

In the casing above the valve is a slot or duct 35 which is adapted to be connected with a suitable source of air under pressure, and beneath the valve in the housing is a duct 36 which communicates with a duct or opening 37 formed in the head 2 and the base 1, which duct opens to the surrounding atmosphere.

The valve 31 extends without the housing 30, being suitably packed to prevent the escape of air. Upon both ends of the valve on the portion extending without the housing there are secured crank arms 38 which are engaged by heads 39 carried by rods 40. These rods extend through openings in the housing 30 and at their upper ends also extend through openings in a yoke 41. This yoke extends upon both sides of the housing, and springs 42 are provided which bear upon the housing and serve to maintain the yoke in proper position with respect thereto. The upper part of the yoke is provided with upwardly extending portions 43 which portions have inwardly extending portions 44. These inwardly extending portions engage a tubular member 45 and within the tubular member 45 extends a rod 46 which is secured upon an extending ear formed upon the cylinder 5, the rod 46 being secured by bolts upon the rod engaging above and below the ear. The relative position of the rod 46 and the tubular member 45 may be varied by manipulation of the nut 47.

The purpose of the construction just defined is for the operation of the valve. The cylindrical member 45 engaging through the nut 47 with the upright members 43 communicates motion to the yoke 41 to turn the valve to allow the admission of air above the piston 3 through the conduits 35 and 30ª. On the other hand, when the upright member 43 is engaged with the nut, or stop upon the lower portion of the member 45, the yoke is raised and causes the valve to turn to bring the groove 33 in the valve into position to establish communication between the duct 37 and the duct 30ª, thus permitting the exhaust of the air.

It will be apparent that the operation just described takes place automatically and intermittently, and when the air is permitted to exhaust from the duct 30ª, the table 15 and the mold carried thereby will be permitted to descend under its own weight, and as the lower portions of the cylinder 5 strikes against the head 2, a jar will be given the mold and its contents, which will cause the packing of the sand in the mold.

It will be apparent that the stripping cylinders and pistons are raised and lowered with the jarring of the table. Consequently, a flexible air conducting means must be provided for the operation of the stripping pistons. This is accomplished as follows: The pipes 48 are secured in the head plates 20ª and 21ª and by a suitable opening through the headplates communicate with the cylinders 20 and 21 beneath the piston heads therein. These pipes extend substantially vertically downward within chambers 49 and 50 formed within the members 51 and 52 secured within the box portion 9. The pipes extend through suitable gland nuts represented at 53, which prevent the escape of air which may be supplied within the chambers 49 and 50. Air is supplied to these chambers 49 and 50 through suitable pipes 49ª and 50ª from an extraneous source, and when air under pressure is so supplied, it causes the pistons 18 and 19 to be raised relative to the molding table 15, and thereby accomplish the function of stripping the pattern and flask in the ordinary and well known manner. The admission of air and the exhaust are governed by valves, not shown. Casting the cylinder 5 and table 15 integral with the stripping cylinders 20 and 21 produces a structure which always preserves the alinement between the respective cylinders so that when the stripping plate is elevated, there is no likelihood of damage to the mold due to an uneven movement of the flask out of alinement with the pattern. Attention is further called to the fact that the rod 46 and the tubular member 45 by which the valve 31 is operated may be adjusted with respect to each other to produce a variety of results.

Obviously, the ordinary manner of running the machine will be to so adjust the valve as to admit air just after the cylinder 5 has contacted with the head 2, and to exhaust the air just as soon as the pattern and mold have been elevated to the desired height. However, if it be necessary to cushion the blow between the cylinder 5 and the head 2, the valve may be adjusted so as to admit air just before the cylinder 5, and head 2 come into contact, thereby cushioning the blow. This variation may be carried even to the extent of admitting sufficient air to prevent the striking between the cylinder 5 and the head 2, so that the table as it descends works against an air cushion.

As has before been mentioned, we attach considerable importance to the fact that the equalizing stripping plate 16 is secured near its opposite ends to the pistons 18 and 19, and the construction is such that as soon as either of the pistons moves faster than its companion piston, there is a binding action between the cylinder and that piston which retards the motion until the companion piston has caught up. This is of great importance, particularly in the making of large molds, for any unequal movement of the stripping plate might result in seriously damaging the mold.

Having thus described our invention, what we claim is:

1. In a molding machine, the combination with a base having a striking head thereon, a piston projecting from said base, a cylinder adapted to strike against the said base and provided upon the upper portion thereof with a molding table, other cylinders cast integral with the first mentioned cylinder, pistons within the last mentioned cylinders, a stripping plate rigidly secured at opposite ends to the last mentioned pistons, and means for admitting air beneath each of the said pistons.

2. In a molding machine, the combination with a base member having a head and a molding table member, one of said members having a piston and the other of said members having a coöperating cylinder, the said piston and cylinder being relatively movable to produce a jarring action, stripping cylinders formed integral with the molding table and the parts carried thereby, pistons within the said stripping cylinders, a stripping plate secured to said pistons, and means for admitting air into all of the said cylinders between the cylinders and the pistons.

3. In a molding machine, the combination with a base having a head, a piston carried by the head, a molding table having a jarring cylinder formed integral therewith, said cylinder being adapted to coöperate with the piston, the lower portions of said cylinder contacting with the head, stripping cylinders formed integral with the said table, pistons coöperating with the said stripping cylinders, a stripping plate joined to the said pistons, chambered members beneath the said stripping cylinders, pipes coöperating with the interiors of the stripping cylinders and extending into the said chambered members, packing means coöperating with the said chambered members through which the pipes extend, means for admitting air to said chambered members, and means for admitting the air to the jarring cylinder.

4. In a molding machine, the combination with a fixed base having a head, a piston member carried by the head, a jarring cylinder member provided with a molding table coöperating with the piston and adapted to contact with the head, a duct formed in one of said members adapted to conduct air under pressure between the piston and cylinder, a casing provided with a mouth adapted to register with the said duct, a valve within said casing, a duct formed within the casing which the said valve divides, and with which the aforesaid mouth communicates, one portion of said duct being connected with a source of air under pressure, and the other portion of said duct being an exhaust, and means for oscillating the said valve to place the said mouth in communication alternately with the portions of the duct which receive air under pressure and exhaust, the said means being operatively connected with the jarring cylinder whereby the valve is automatically turned as the table is jarred.

5. In a molding machine, the combination with a base having a head, a piston member carried by the head, a jarring cylinder member provided with a molding table, which cylinder coöperates with the piston and is adapted to contact with the head, a duct formed in one of said members adapted to conduct air under pressure between the piston and cylinder, a valve coöperating with said duct, said valve being provided with separated grooves, one of said grooves being adapted to communicate with a source of air under pressure, the other of said grooves being adapted to communicate with an exhaust, means for oscillating said valve, the oscillation of said valve alternately connecting the space between the jarring piston and cylinder with the source of air under pressure and the exhaust.

6. In a molding machine, the combination with a device having a head, a piston member carried by said head, a jarring cylinder member provided with a table coöperating with the head, a duct formed in one of said members adapted to communicate with a space between the jarring piston and cylinder, a valve provided with separated grooves, one of said grooves being in communication with a source of air under pressure, the other of said grooves being in communication with an exhaust, a yoke operatively connected with the said valve, connections between the said yoke and the jarring cylinder whereby the valve is oscillated to alternately connect the duct leading to the space between the jarring cylinder and piston with the source of air under pressure and with the exhaust.

7. In a molding machine, the combination with a base having a head, a piston carried by the head, a jarring cylinder provided with a molding table coöperating with the piston, the said base being adapted to be located in a pit beneath the level of the molding floor, a cover provided with a central opening adapted to cover the said pit, the said cover having an upturned flange around the opening therein, a stripping plate normally resting upon said molding table, said stripping plate being provided at its outer edge with a downwardly extending flange coöperating with the upturned flange to prevent the entrance of dirt into the pit, and means for admitting and exhausting air between the jarring piston and cylinder.

In testimony whereof, we hereunto affix our signatures in the presence of two witnesses.

GEORGE F. STONEY.
GEORGE L. CAMPBELL.

Witnesses:
T. W. MORGAN,
P. J. MCFARLAND.